United States Patent [19]
Genov et al.

[11] Patent Number: 5,839,322
[45] Date of Patent: Nov. 24, 1998

[54] ROBOTIC ARM ROTATION CONTROLLER

[75] Inventors: Genco Genov, Sunnyvale; Gou-Kin Cui, Fremont, both of Calif.

[73] Assignee: Genmark Automation, Sunnyvale, Calif.

[21] Appl. No.: 592,225

[22] Filed: Jan. 26, 1996

[51] Int. Cl.⁶ .................................................. B25J 19/00
[52] U.S. Cl. .................. 74/490.01; 74/490.02; 74/526; 901/12; 901/49; 414/918
[58] Field of Search .............................. 74/526, 820, 822, 74/415, 490.01, 490.02; 192/139; 901/12, 49, 50; 414/918

[56] References Cited

U.S. PATENT DOCUMENTS

| | | | |
|---|---|---|---|
| 1,721,524 | 7/1929 | Moore | 74/526 |
| 3,012,447 | 12/1961 | Wallace | 74/526 |
| 3,178,001 | 4/1965 | Prescott | 192/139 |
| 3,405,562 | 10/1968 | Brandt | 74/526 |
| 3,662,610 | 5/1972 | Thoen | 74/526 |
| 4,166,543 | 9/1979 | Dahlstrom . | |
| 4,466,307 | 8/1984 | Kouno . | |
| 4,664,587 | 5/1987 | Case, Jr. et al. . | |
| 4,762,459 | 8/1988 | Morita et al. . | |
| 5,064,340 | 11/1991 | Genov et al. | 414/744.5 |
| 5,178,512 | 1/1993 | Skrobak . | |
| 5,220,849 | 6/1993 | Lande et al. . | |

FOREIGN PATENT DOCUMENTS

| | | |
|---|---|---|
| 0 410 823 A1 | 1/1991 | European Pat. Off. . |
| 2 120 202 | 11/1983 | United Kingdom . |

*Primary Examiner*—Charles A. Marmor
*Assistant Examiner*—Troy Grabow
*Attorney, Agent, or Firm*—Burns, Doane, Swecker & Mathis, LLP

[57] ABSTRACT

An apparatus provides θ-rotational motion about a Z-axis. The apparatus is improved as follows. A stop structure is carried by the apparatus and rotates with it. The stop structure has a detent engagement structure. A detent structure comprises a rotatable member located adjacent to the stop structure. The rotatable member is mounted for free rotation about an axis parallel to the Z-axis. The rotatable member defines a plurality of detentes which are adapted for sequential engagement with the detent engaging structure as the stop structure rotates about the Z-axis. A biasing structure serves for biasing the stop member to deter it from rotating. The biasing structure is overcome by action of the detent engaging structure with any one of the detentes and otherwise prevents rotation of the stop member. A stationary detent is located adjacent the stop member. The stationary detent engages with and halts rotation of the stop member beyond a selected rotational position. It acts through the stop member to stop rotation of the apparatus about the Z-axis.

15 Claims, 3 Drawing Sheets

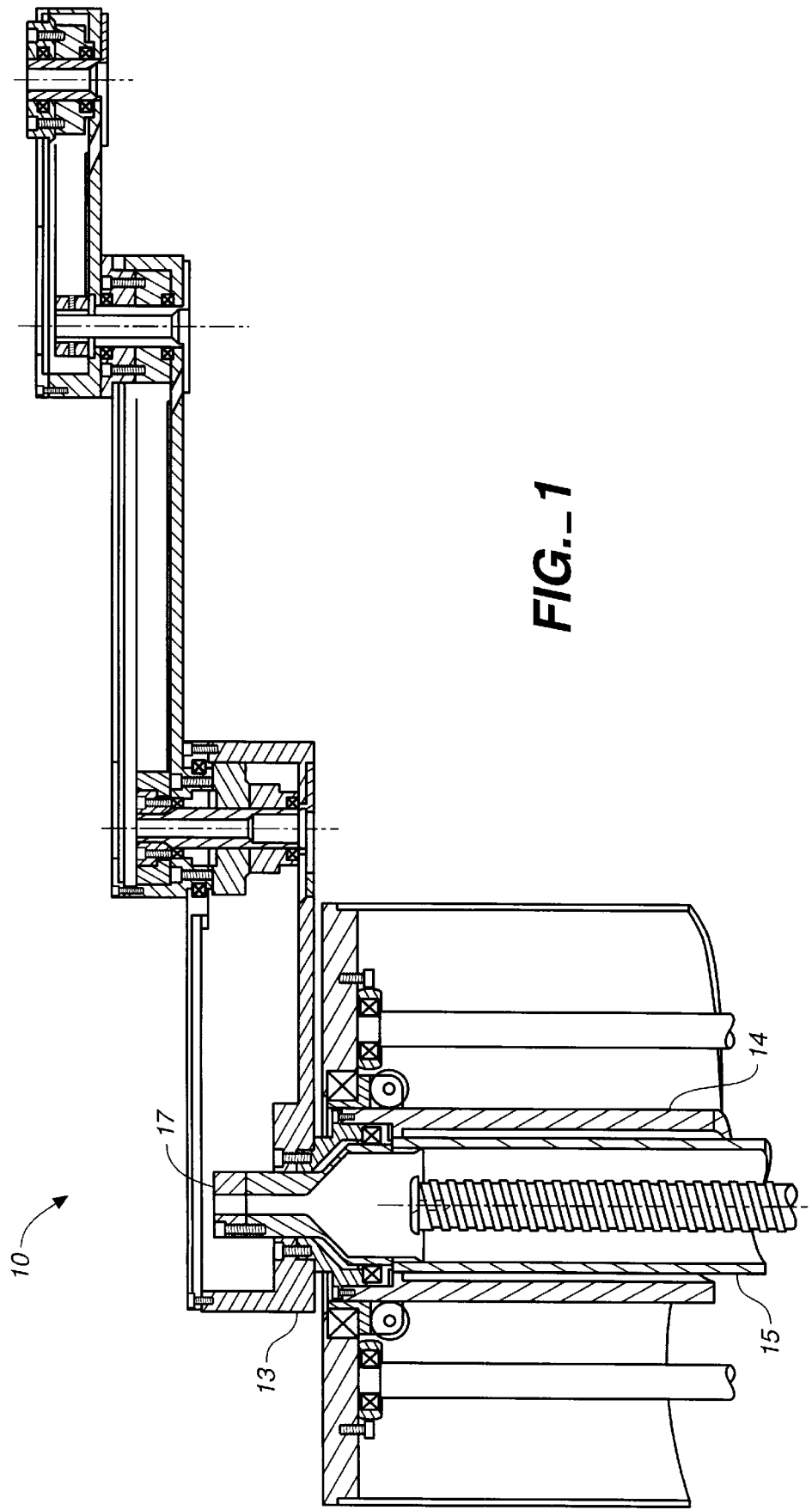
FIG._1

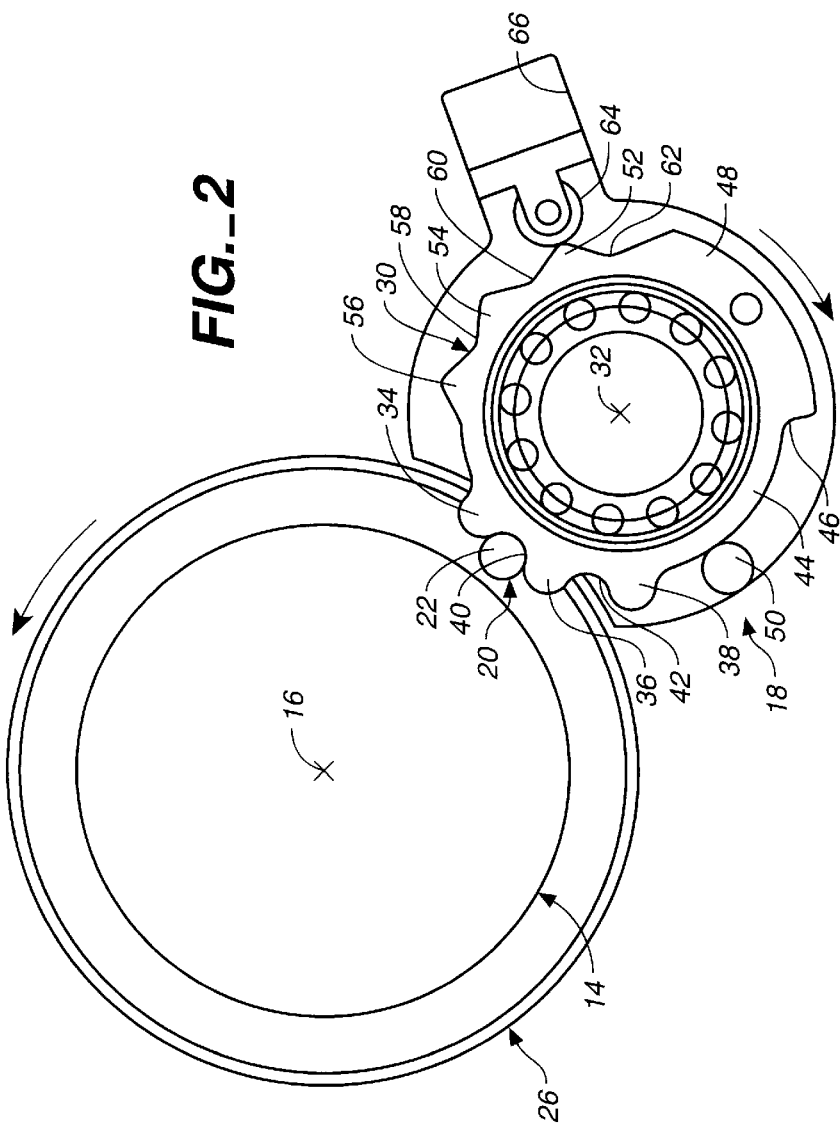
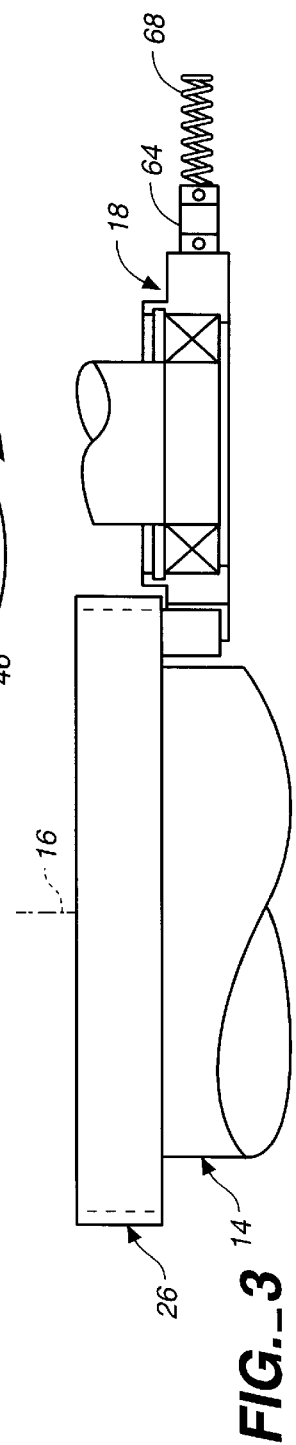
FIG._2
FIG._3

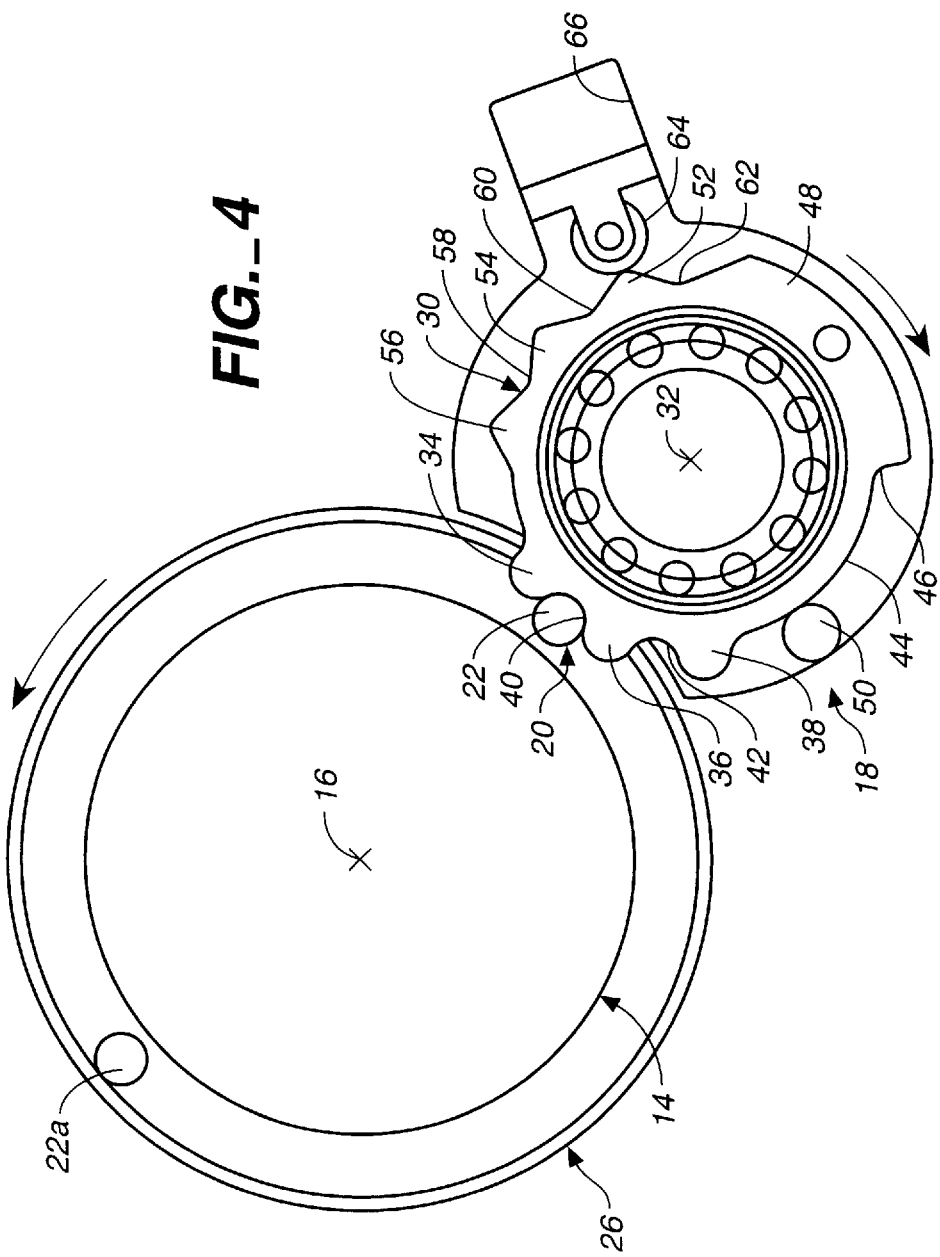
FIG._4

ROBOTIC ARM ROTATION CONTROLLER

TECHNICAL FIELD

The present invention relates to a precision robotic arm mechanism which will extend and retract in a straight line and is suitable for positioning various objects such as semiconductor wafers, cassettes holding such wafers, computer hard discs, and the like for processing and/or use. More particularly, the invention relates to a structure for allowing the robotic arm mechanism to rotate over 360°.

BACKGROUND OF INVENTION

The use of robot arms for positioning and placing objects is well known. Generally, the arms have Z-, R- and θ-motion in a conventional cylindrical coordinate system. The capability of providing greater than 360° rotation about the Z-axis (greater than 360° θ-motion) would be highly desirable since it would allow the wafers to be positioned without as many reverse rotations as are currently needed to accomplish this. In short, it would improve the efficiency of the entire operation thereby increasing throughput. Prior to the present invention such a capability was not available.

By way of background, commonly, two link arms with equal length links have been utilized to accomplish straight line motion of an end effector. The links are connected to each other so that distal end of the first link is pivotally attached to the proximal end of the second link. The links utilize belt drives which are provided for coordinately rotating the second link to the first link to provide a rotation ratio, $i_{2,1}$ of 2/1, and to provide a rotation ratio, $i_{3,2}$ of 1/2 between the end effector and the distal link of the robotic arm. When $i_{2,1}$ is equal to 2/1 and $i_{3,2}$ is equal to 1/2, the result is that $i_{3,1}$, the rotation ratio of the end effector relative to the first link, is equal to 2/1×1/2 or unity and straight line motion results. In the case of 3 link arms, such as those shown in U.S. Pat. No. 5,064,340, which is incorporated herein by reference, the rotation ratio between the third and second links is 1/1 and other ratios are as just discussed above. In this situation $i_{21}$ is equal to 2/1, $i_{3,2}$ is equal to 1/1 and $i_{4,3}$ is equal to 1/2. This assures that $i_{4,1}$ is equal to unity and straight line motion results.

The links cannot be allowed to freely rotate about the Z-axis since they carry lines, for example, vacuum lines and electric signal carrying lines, which would become entangled and broken or pulled loose should all rotation be, for example, in one direction. To prevent rotation over 360° from occurring it is conventional to provide a stop which takes up a few degrees, e.g., 10 degrees or so of arc, and which positively prevents rotation in either direction when it is engaged by a flange or other structural feature, i.e., by a stop or detent, which rotates as part of or along with the overall apparatus for rotating about the Z-axis. To get from, for example, 355° to 5°, it is necessary to reverse direction and travel 350°. Clearly this is a time consuming procedure. Also, there is then a 10° portion of arc which is simply not accessible.

DISCLOSURE OF INVENTION

The present invention is directed to overcoming one or more of the problems as set forth above.

An embodiment of the invention comprises an improvement in an apparatus which provides θ-rotational motion about a Z-axis. The improvement comprises a stop structure carried by the apparatus and rotating with the apparatus with θ-rotational motion about the Z-axis. The stop structure has a detent engagement structure. A detent structure also forms a part of the improvement. It comprises a rotatable member adjacent to the stop structure. The rotatable member is mounted for free rotation about an axis parallel to the Z-axis. The rotatable member defines a plurality of detents which are adapted for sequential engagement with the detent engaging structure as the stop structure rotates about the Z-axis. A biasing structure serves for biasing the stop member to deter it from rotating. The biasing structure is overcome by action of the detent engaging structure with any one of the detentes and otherwise prevents rotation of the stop member. A stationary detent is located adjacent the stop member. The stationary detent engages with and halts rotation of the stop member beyond a selected rotational position. It acts through the stop member to stop rotation of the apparatus about the Z-axis.

The improvement set forth above allows a robotic arm mechanism or the like to be rotated over 360° thereby increasing its efficiency. It also limits rotation, as desired, to prevent entanglement and/or damage to components such as vacuum lines and electronic sensor leads. The result is the ability to more quickly move semiconductor wafers and the like from one workstation to another. This increases throughput thus directly increasing profitability through reducing processing time. Furthermore, all of this is accomplished by providing a relatively simple and inexpensive structure which can be retrofit to existing apparatus.

BRIEF DESCRIPTION OF THE DRAWINGS

The invention will be better understood by reference to the figures of the drawings wherein like numbers denote like parts throughout and wherein:

FIG. 1 illustrates, in partial side view, in section, a robotic arm mechanism to which the present invention makes an improvement;

FIG. 2 illustrates, in schematic bottom view, the improvement of the invention; and FIG. 3 is a side view of the FIG. 2 embodiment.

FIG. 4 illustrates, in schematic bottom view, a second embodiment of the invention.

DETAILED DESCRIPTION OF INVENTION

FIG. 1 illustrates a robotic arm mechanism 10 which provides R-, Z- and θ-motion to an end effector 12. θ-motion is provided by rotation of rotary axle 13 driven by tubular member 14 about an axis 16. R-motion is provided by rotation of tubular member 15 about the same axis 16 which rotates pulley 17. The mechanism is useful for positioning semiconductor wafers in a multistep wafer processing operation. It can also be used with other types of workpieces.

FIGS. 2 and 3 show the tubular member 14 and the axis 16 along with a arrangement 18 in accordance with the present invention. The arrangement 18 includes a stop structure 20, in accordance with the invention. The particular stop structure illustrated comprises a single post 22, although additional posts may be desirable in some instances as will be explained below, mounted to a circular member 26 which is coaxial with and rotates with the tubular member 14. The post 22 extends generally upwardly (or downwardly) from the circular member 26 adjacent its periphery 28.

A lobular stop member 30 is located adjacent to the stop structure 20 and is positioned to become engaged with it. The lobular stop member 30 is mounted for free rotation in either direction about an axis 32 which is parallel to the axis 16 of the tubular member 14. The stop member 30 defines a plurality of (at least two) lobes 34, 36 and 38 separated by depressions 40 and 42. A depression 44 follows (The directions of rotation about axes 16 and 32 are indicated by arrows.) the lobes and ends in a stop surface 46 defined by a rise 48. A detent 50 is positioned to contact the rise 48 on sufficient rotation of the lobular stop member 30 in the direction indicated by the arrows whereupon further rotation of the lobular stop member 30 in the direction indicated is terminated. Rotation of the stop member 30 in the opposite direction is prevented by the lobe 38. Thus, in a sense, the lobular stop member 30 can be ratcheted through only the degree of arc defined by the depression 44. The depressions 40, 42 and 44 are adapted to and serve to receive the stop structure 20 therein. The lobes 34, 36 and 38 each extend outwardly enough so as to be contacted and impelled to rotate by the stop structure 20 when it is within an adjacent depression.

The stop member 30 further includes a number of braking lobes 52, 54, 56 with braking lobes 52 and 54 being separated by concavity 60, braking lobes 54 and 56 being separated by concavity 58 and a concavity 62 being provided on the opposite side of lobe 52 from the concavity 60. A bearing member 64, generally within a tube 66, is biased, e.g., as illustrated by a spring 68, into one or the other of the concavities 58, 60 and 62, depending on the rotational position of the lobular stop member 30.

Operation of the above described structures will now be discussed. With the mechanism aligned as illustrated in FIG. 2 and with rotational movement being as indicated by the arrows the following occurs. Post 22, which initially was located in the position shown has already rotated 360°. It contacts lobe 34 and forces stop member 30 to rotate by pushing against the side of lobe 34. As the rotation occurs, bearing member 64 is pushed upwardly overcoming the biasing provided by spring 68 whereby bearing member 64 travels over lobe 52 and thereby passes from concavity 62 to concavity 60. The bearing member 64 and spring 68 thus act to prevent continued rotation of stop member 30 after the post 22 has ceased to bear against lobe 34. Due to the rotation of stop member 30, the depression 44 has been rotated one-third of its arcuate length.

The tubular member 14 now rotates another 360° whereupon the post 22 contacts the lobe 36. The post 24 is now in depression 42 and is motivating lobe 36 to cause the stop member 30 to rotate. The depression 44 has been rotated an additional one-third of its length. The total rotation so far is 720°, i.e., there have been two 360° rotations.

The process continues with the post 22 rotating an additional 360° whereupon it is in depression 44 and it contacts the lobe 38 to cause stop member 30 to rotate. The rotation continues until detent 50 contacts stop surface 46. The total rotation is now 1080°, i.e., there have now been three 360° rotations. Conventional detector and computer control circuitry as is currently well know in the art to detect stopping of rotation and reverse direction of rotation when rotation is restricted to 360°, is utilized to reverse rotation of the tubular member 14. In the reverse direction precisely the same process occurs as described above with the lobes 34, 36 and 38 now being contacted and motivated by posts 22, 24 on their opposite sides.

While the above description assumes that there is a single post 22 and three lobes 34, 36, 38 with which it interacts it will be clear that two (or more) posts can be used instead. Also, as shown in FIG. 4, it will be clear that if, for example, two posts (22, 22a) are used which are 180° apart, with the same three lobes 34, 36, 38, the result will be 540° rotation rather than 1080° rotation. Also, if one post is used and only two lobes, the result will be 720° rotation. In the embodiment illustrated this would halve the rotation. Thus, more posts can be used. And, the number of lobes on the stop member 30 can be set as desired to provide a desired amount of rotation of the tubular member 30. The arcuate lengths of the depressions 40, 42 and 44 is also a matter of design choice as is the diameter of the stop member 30. The post 22 can be replaced with a lobe extending outwardly from the stop structure 20 which can engage with lobes or posts carried by the stop member 30. The invention is directed to these and other mechanically equivalent structures for providing the capability to rotate a robotic arm mechanism over 360°.

INDUSTRIAL APPLICABILITY

The present invention provides a robotic arm structure 10 which is rotatable for over 360° but which is positively stopped so as to prevent overrotation about the Z-axis. It is useful for a number of things, particularly for positioning semiconductor wafers for processing.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. An apparatus for limiting rotation in a mechanism which includes at least one member having a θ-rotational motion about a Z-axis, the improvement comprising:

a stop structure carried by the mechanism and rotating with the mechanism with θ-rotational motion about the Z-axis; and a detent structure which comprises:

a rotatable member adjacent to the stop structure, the rotatable member being mounted for free rotation about an axis parallel to the Z-axis, the rotatable member defining a plurality of detent means for sequential engagement with the stop structure as the stop structure rotates about the Z-axis;

biasing means for biasing the rotatable member at a first portion of the rotatable member to deter rotation thereof, the biasing means being overcome by action of the stop structure with any one of the detent means and otherwise preventing rotation of the rotatable member; and a stationary member adjacent the rotatable member, the stationary member being engagable with a second portion of the rotatable member to halt rotation of the rotatable member beyond a selected rotational position thereof and to act through the stop structure to stop rotation of the apparatus about the Z-axis.

2. An apparatus as set forth in claim 1, wherein the mechanism comprises a robotic arm mechanism capable of R-, Z- and θ-motion.

3. An apparatus as set forth in claim 2, wherein the stop structure and the detent structure are so constructed and positioned as to allow rotation of the robotic arm mechanism about the Z-axis of greater than 360°.

4. An apparatus as set forth in claim 3, wherein the stop structure comprises a pair of engagers located 180° apart.

5. An apparatus as set forth in claim 4, wherein the detent structure allows for 540° rotation of the robotic arm mechanism.

6. An apparatus as set forth in claim 1, wherein the stop structure and the detent structure are so constructed and positioned as to allow rotation of the apparatus about the Z-axis of greater than 360°.

7. An apparatus as set forth in claim 6, wherein the stop structure comprises a pair of engagers located 180° apart.

8. An apparatus as set forth in claim 7, wherein the detent structure allows for 540° rotation of the at least one member.

9. An apparatus as set forth in claim 1, wherein the stop structure comprises a pair of engagers located 180° apart.

10. An apparatus as set forth in claim 9, wherein the detent structure allows for 540° rotation of the at least one member.

11. An apparatus for limiting rotation in a robotic arm mechanism which provides θ-rotational motion about a Z-axis, the improvement comprising:

a stop structure carried by the arm mechanism and rotating with the arm mechanism with θ-rotational motion about the Z-axis, the stop structure comprising a detent engagement structure; and a stop member adjacent to the stop structure and positioned to become engaged to be rotated thereby, the stop member being mounted for free rotation about an axis parallel to the Z-axis, the stop member defining a plurality of detents separated from one another, each detent receiving the detent engagement structure as the detent engagement structure rotates in a first direction about the Z-axis and to be contacted and impelled to rotate by the detent engagement structure;

biasing means for biasing a first portion of the stop member to deter rotation thereof, the biasing means being overcome by action of the detent engagement structure against one of said plurality of detents; and a stationary member adjacent the stop member, the stationary member engagable with a second portion of the stop member to halt rotation of the stop member beyond a selected rotational position thereof and to act through the stop member to stop rotation of the apparatus about the Z-axis.

12. An apparatus as set forth in claim 11, wherein the detent engagement structure and the detent structure are so constructed and positioned as to allow rotation of the robotic arm mechanism about the Z-axis of greater than 360°.

13. An apparatus as set forth in claim 12, wherein the detent engagement structure comprises a pair of engagers located 180° apart.

14. An apparatus as set forth in claim 13, wherein the detent structure allows for 540° rotation of the robotic arm mechanism.

15. An apparatus as set forth in claim 12, wherein the detent structure allows for 1080° rotation of the robotic arm mechanism.

* * * * *